United States Patent
Podlucky et al.

(10) Patent No.: US 7,067,168 B1
(45) Date of Patent: Jun. 27, 2006

(54) TEA BREWING SYSTEM

(75) Inventors: Gregory J. Podlucky, Ligonier, PA (US); Jonathan E. Podlucky, Latrobe, PA (US); Frederick G. Drummond, Monroeville, PA (US)

(73) Assignee: Le-Nature's, Inc., Latrobe, PA (US)

( * ) Notice: Subject to any disclaimer, the term of this patent is extended or adjusted under 35 U.S.C. 154(b) by 403 days.

(21) Appl. No.: 10/076,253

(22) Filed: Feb. 13, 2002

(51) Int. Cl.
*A23L 3/16* (2006.01)

(52) U.S. Cl. ............... 426/435; 426/597; 426/431; 426/433

(58) Field of Classification Search .......... 426/435, 426/597, 77–81, 431, 433
See application file for complete search history.

(56) References Cited

U.S. PATENT DOCUMENTS

| | | | |
|---|---|---|---|
| 168,545 A | 10/1875 | Webber | |
| 436,044 A | 9/1890 | Miller | |
| 477,023 A | 6/1892 | Seiffert | |
| 519,108 A | 5/1894 | Fontneau | |
| 697,251 A | 4/1902 | Hubbell | |
| 2,678,000 A | 5/1954 | Scheidt et al. | |
| 2,878,927 A * | 3/1959 | Haley | 426/80 |
| 3,224,880 A | 12/1965 | Van Ike | |
| 4,354,427 A * | 10/1982 | Filipowicz et al. | 99/307 |
| 4,602,145 A * | 7/1986 | Roberts | 392/496 |
| 4,751,875 A | 6/1988 | Wooten, Jr. | |
| 4,790,239 A | 12/1988 | Hewitt | |
| 4,919,041 A | 4/1990 | Miller | |
| 4,988,019 A | 1/1991 | Dawes | |
| 5,072,660 A | 12/1991 | Helbling | |
| 5,116,632 A | 5/1992 | Miller | |
| 5,408,917 A | 4/1995 | Lussi | |
| 5,478,586 A | 12/1995 | Connor | |
| 5,544,566 A | 8/1996 | Bersten | |
| 5,612,079 A * | 3/1997 | Lunder | 426/597 |
| 5,657,898 A * | 8/1997 | Portman et al. | 220/712 |
| 5,733,591 A * | 3/1998 | Goerndt | 426/231 |
| 5,899,137 A * | 5/1999 | Miller et al. | 99/295 |
| 6,079,314 A * | 6/2000 | Mackinnon | 99/289 R |

FOREIGN PATENT DOCUMENTS

| | | | |
|---|---|---|---|
| DE | 4433474 | * | 3/1996 |
| GB | 1209055 | | 11/1967 |

* cited by examiner

*Primary Examiner*—Anthony Weier
(74) *Attorney, Agent, or Firm*—Reed Smith LLP

(57) ABSTRACT

The tea brewing system includes a blending system, brewing system, bag squeezing system and cooling system to produce liquid tea for bottling and distribution. The blending system includes a system for heating and blending water, sweetener and other flavorings in appropriate proportions. The brewing system in includes brewing and filtering mechanisms coupled with the blending system to brew liquid tea concentrate. A bag squeezing system provides apparatus and method for introducing tea bags into a brew tank and for squeezing tea from the bags into water for producing liquid tea concentrate.

26 Claims, 5 Drawing Sheets

TEA BREWING SYSTEM

BACKGROUND OF THE INVENTION

1. Field of the Invention

The present invention relates generally to a beverage preparation system, and more particularly to a tea brewing system.

2. Background of the Invention

Ready-to-drink tea containing products have become increasingly popular. Many tea containing beverage preparation systems use tea extracts or tea powder to produce tea flavored beverages rather than brewing with actual tea leaves in tea bags. Also, existing tea beverage systems are not fully automated and expose the tea to air throughout the preparation process resulting in inconsistently flavored tea beverages.

Therefore, what is needed is an automated tea brewing system that utilizes actual tea leaves in tea bags for brewing tea-flavored beverages without exposing the tea to air.

The present invention proposes to overcome the above limitations with an automated tea brewing system utilizing actual tea in tea bags.

SUMMARY OF THE INVENTION

The tea brewing system comprises a blending system, brewing system, bag squeezing system and a cooling system. The blending system comprises a system for heating and blending water, sweetener and other flavorings in appropriate proportions. The brewing system comprises brewing and filtering mechanisms coupled with the blending system to brew liquid tea concentrate. The bag squeezing system provides apparatus and method for introducing tea bags into a brew tank and for squeezing tea from the bags and into water for producing liquid tea concentrate. After the tea concentrate has been blended and brewed, a cooling system is utilized to reduce the temperature of the liquid tea concentrate and to preserve the concentrate until the tea concentrate is mixed with water and bottled.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings wherein like reference characters designate the same or similar elements and wherein:

DETAILED DESCRIPTION OF THE PREFERRED EMBODIMENT

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

Figure 1:
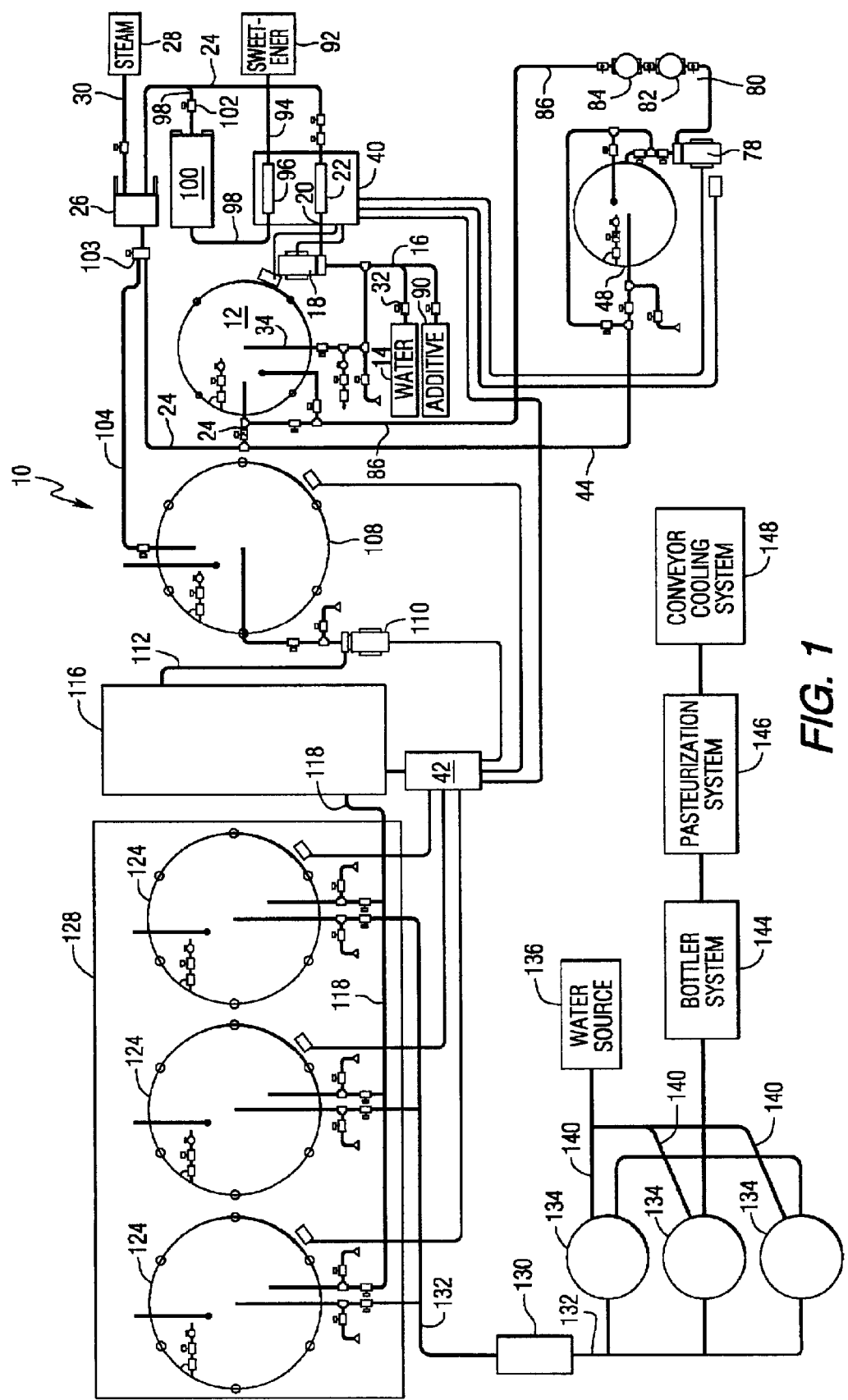
FIG. 1 is a schematic view of the tea brewing system of the present invention.

Referring to FIG. 1, the tea brewing system 10 comprises a blend tank 12 which may be a 3,000 gallon tank. A water source 14, which may be a purified water source wherein the water has been purified by filtering and reverse osmosis, is connected by conduit 16 to blend pump 18, which may be a seven (7) horsepower centrifugal pump, for pumping water from blend tank 12. Blend pump 18 is connected by conduit 20 to mass flow meter 22, which may be a Micromotion mass flow meter, for measuring the fluid passing therethrough.

Mass flow meter 22 is connected by conduit 24 to blend tank 12. Conduit 24 is arranged in heat transfer relationship with first heat exchanger 26 for heating the fluid passing through conduit 24. First heat exchanger 26 may be a steam heat exchanger. A steam source 28, which may be a conventional boiler that produces steam at about 216° F., is connected by conduit 30 to first heat exchanger 26 for providing heat to first heat exchanger 26.

As can be seen in FIG. 1, water from water source 14 is conducted through blend pump 18, through mass flow meter 22 and through first heat exchanger 26 into blend tank 12. On the initial filling of blend tank 12, blend pump 18 may be used to pump water through mass flow meter 22 depending on whether water source 14 is sufficiently pressurized. If water source 14 has sufficient pressure, blend pump 18 may be by-passed on the initial fill of blend tank 12. Typically, about 2,100 gallons of water at ambient temperature are introduced into blend tank 12 at the beginning of the process. When the required amount of water, as measured by mass flow meter 22, has been pumped into blend tank 12, a valve, such as valve 32, is activated to discontinue the flow of water from water source 14. The water may then be pumped from blend tank 12 by blend pump 18 through conduit 34, through first heat exchanger 26 and back to blend tank 12 thereby heating the water to approximately 198° F. Thus, the water is circulated through first heat exchanger 26 until the water reaches the desired temperature.

A first control panel 40 and a second control panel 42, which may be SIG Simonazzi control panels, are electrically connected to the various components of the system to operate the components as described herein.

Once the water in blend tank 12 reaches its desired temperature, the brew cycle begins. During the brew cycle, heated water from blend tank 12 is pumped by blend pump 18 out of blend tank 12 through conduit 24 and into conduit 44 by activating and deactivating various valves in the system under control of first control panel 40. The water t hen flows through conduit 44 and into brew tank 48 until the desired amount of heated water, such as 600 gallons, is introduced into brew tank 48 and reaches a predetermined height in brew tank 48.

Figure 2:
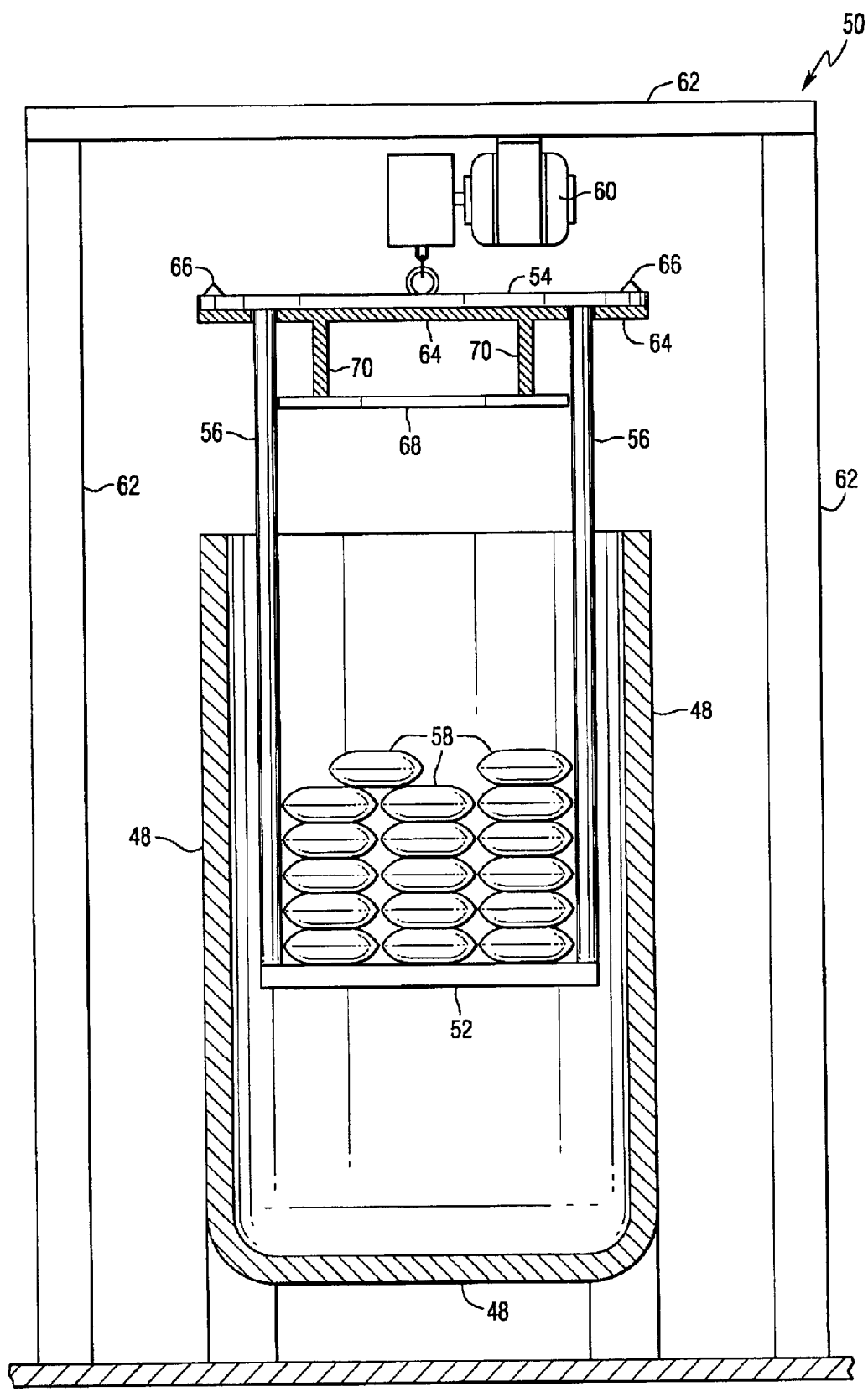
FIG. 2 is a cross-sectional side view of the tea bag squeezing system in a tea bag loading position.

Referring now to FIG. 2, brew tank 48 may include a tea bag squeezing system 50 disposed in and above brew tank 48. Tea bag squeezing system 50 may comprise a lifting base 52 disposed in brew tank 48 and connected IU to brew tank lid 54 by a plurality of vertically arranged metal support rods 56. A plurality of tea bags 58, which may typically be 44 twenty (20) pound bags of China black or other tea, may be disposed on lifting base 52. When brew tank lid is attached to brew tank 48, outside air is prevented from contacting water in the system. A cover gas of nitrogen may be used to prevent oxygen from contacting the water.

Brew tank lid 54 may be attached to an externally mounted hoist 60, such as a five (5) ton hoist, and supported over brew tank 48 by supporting structure 62. Hoist 60 is arranged to move lifting base 52 to various selected elevations in brew tank 48.

Figure 4:
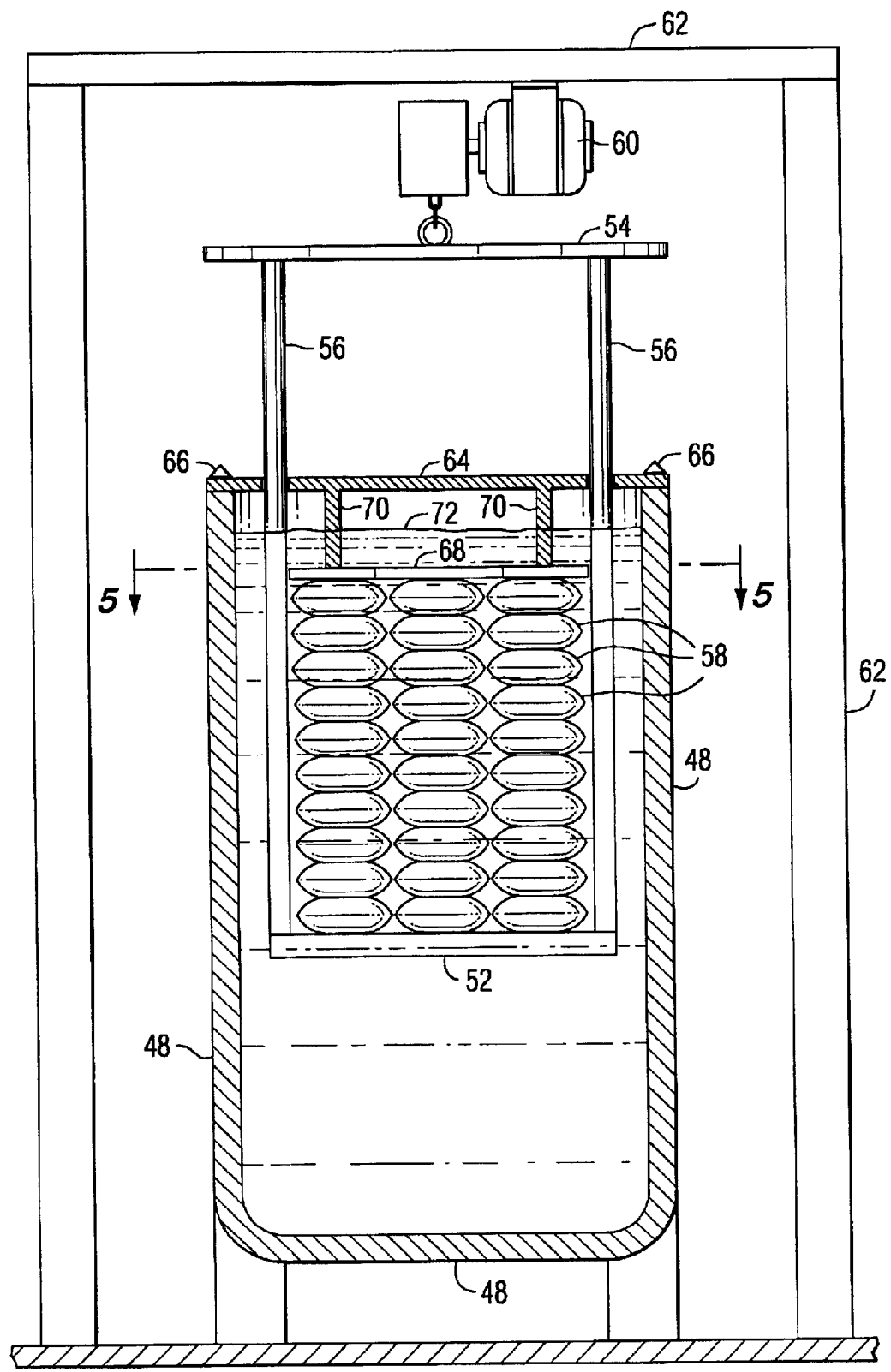
FIG. 4 is a cross-sectional side view of the tea bag squeezing system in a tea bag squeezing position.
Figure 5:
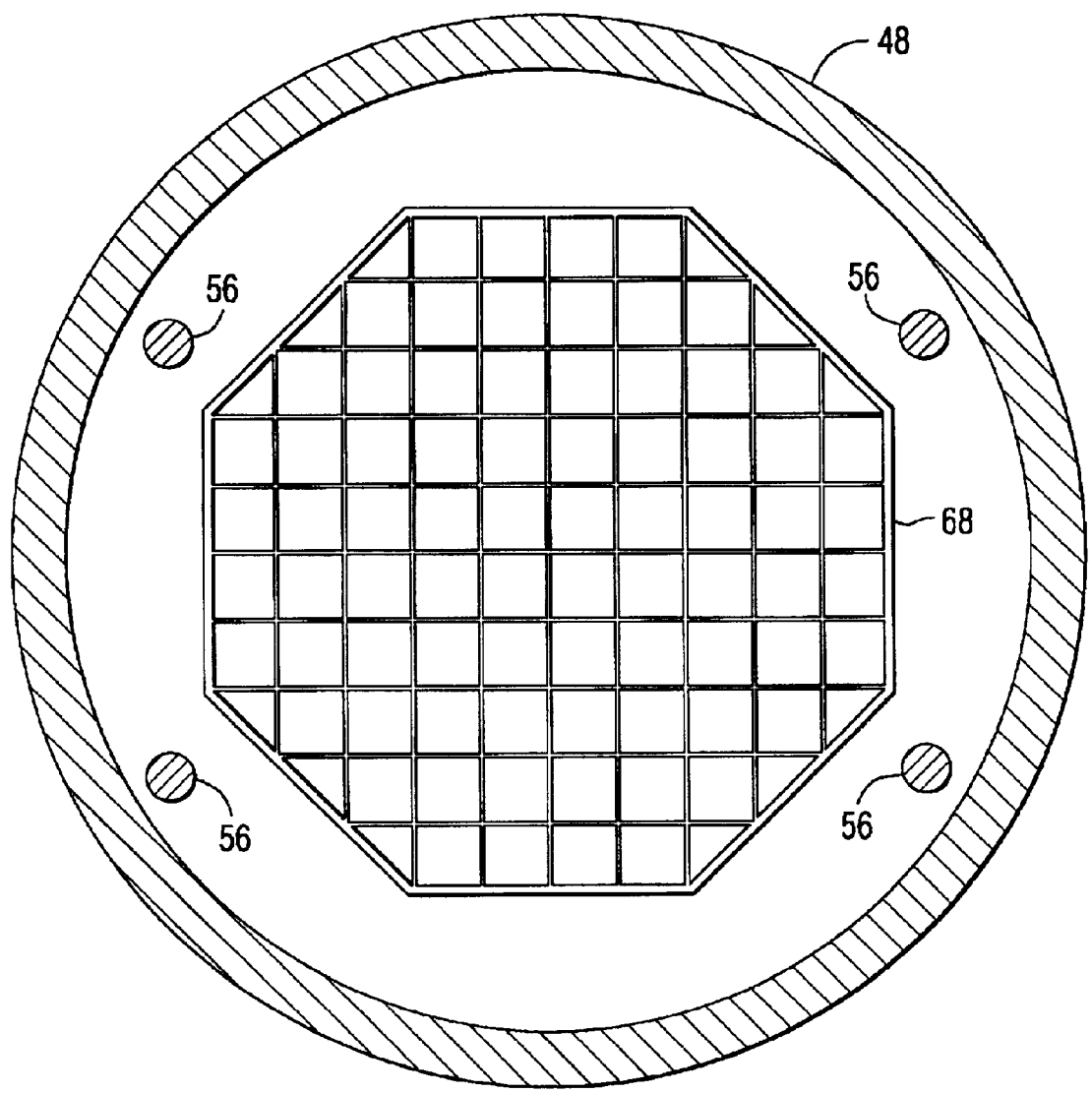
FIG. 5 is a view along line 5—5 of FIG. 4.

A squeeze plate 64 is detachably connected to brew tank lid 54 by stainless steel pins 66. Supports rods 56 extend through openings in squeeze plate 64 so that brew tank lid 54 and support rods 56 may move vertically relative to squeeze plate 64 as shown in FIG. 4. A tea bag hold plate 68, preferably in the form of an octagonal grid, is spaced vertically beneath the squeeze plate 64 and is connected to squeeze plate 64 by vertical rods 70 so that hold plate 68 is vertically moveable with squeeze plate 64. Squeeze plate 64 and hold plate 68 move with brew tank lid 54 when pins 66 are in place as shown in FIG. 2.

As shown in FIG. 4, when pins 66 are removed, squeeze plate 64 and brew tank lid 54 are not attached so that when hoist 60 raises brew tank lid 54, squeeze plate 64 rests on brew tank 48.

Referring now to FIG. 2, in order to load tea bags 58 onto lifting base 52, hoist 60 raises brew tank lid 54. With pins 66 connecting brew tank lid 54 to squeeze plate 64, raising brew tank lid 54 causes squeeze plate 64 to rise. Since lifting base 52 is connected to squeeze plate 64 by support rods 56, raising squeeze plate 64 causes lifting base 52 to rise allowing an operator to load tea bags 58 onto lifting base 52. Generally, tea bags 58 are loaded on lifting base 52 before water is introduced into brew tank 48. Hoist 60 may then lower brew tank lid 54 so that it rests on and seals brew tank 48 as shown in FIG. 3.

Figure 3:
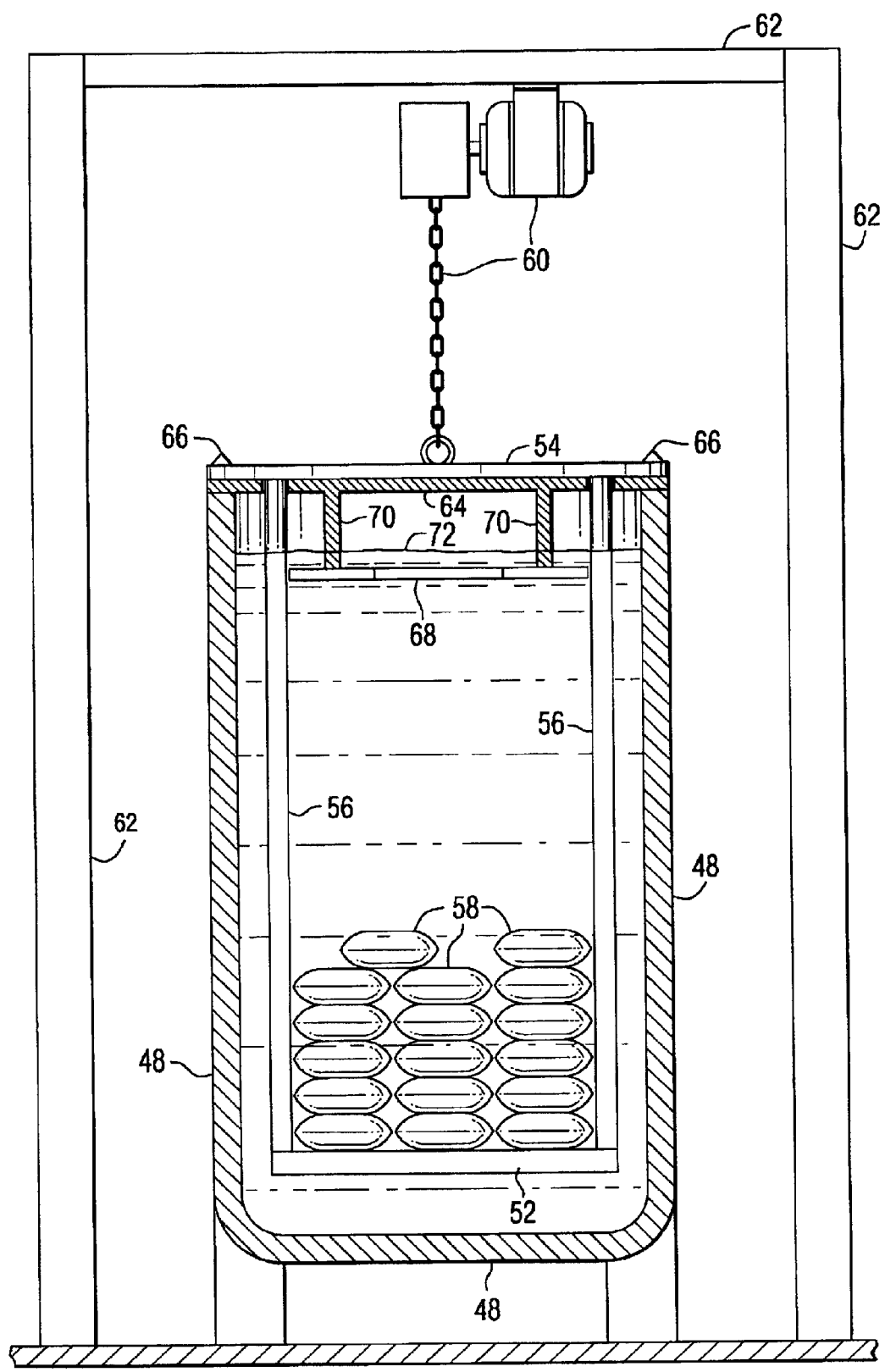
FIG. 3 is a cross-sectional side view of the tea bag squeezing system in a brewing position.

After tea bags 58 are loaded onto lifting base 52 and lowered into brew tank 48, as shown in FIG. 3, water is then conducted from conduit 44 into brew tank 48 until the desired amount of heated water is introduced into brew tank 48. The water in brew tank 48 may reach water level 72. In this configuration, hold plate 68 is disposed below water level 72 and acts to hold tea bags 58 below water level 72. The heated water in contact with tea bags 58 in brew tank 48 forms liquid tea concentrate.

Referring to FIG. 4, after the brewing process is completed as described hereinbelow, tea bags 58 may be squeezed to remove additional tea. When it is desired to squeeze tea bags 58, brew tank lid 54 is detached from squeeze plate 64 by removing pins 66. Pins 66 may be used to attach squeeze plate 64 to brew tank 48. However, pins 66 may not be needed if the weight of squeeze plate 64 is sufficient to hold it on brew tank 48. Hoist 60 then raises brew tank lid 54, which causes lifting base 52 to move vertically relative to squeeze plate 64 until tea bags 58 contact hold plate 68 thereby squeezing tea from tea bags 58.

Referring again to FIG. 1, liquid tea concentrate is pumped from brew tank 48 into conduit 80 by brew pump 78, which may be a ten (10) horsepower centrifugal pump. Brew pump 78 may be activated when the liquid in brew tank 48 reaches a predetermined level. From conduit 80, liquid tea may be conducted through a first filter 82 and through a second filter 84 to remove tea leaf particles. First filter 82 may be a five (5) micron filter and second filter 84 may be a one (1) micron filter, such as those available from Millipore Corporation.

From second filter 84, the liquid tea concentrate is conducted through conduit 86 and into blend tank 12. Blend pump 18 pumps the liquid tea concentrate through first heat exchanger 26, through conduit 44 and into brew tank 48. Circulation of the liquid tea concentrate through the blend tank 12 and brew tank 48 continues for about 60 to 70 minutes, and preferably for approximately sixty (60) minutes, while first heat exchanger 26 maintains the temperature of the liquid tea concentrate between approximately 180° F. and 200° F., and preferably about 198° F.

At the end of the brew cycle all the liquid tea concentrate is pumped into blend tank 12. At this time tea bags 58 in brew tank 48 may be squeezed in a manner as described above to remove additional liquid tea concentrate therefrom. This additional liquid tea concentrate is then pumped to blend tank 12 by brew pump 78.

Still referring to FIG. 1, an additive source 90 may be connected by valving to conduit 16 to add selected flavors, tea essence, coloring and/or acids, such as phosphoric acid, to the liquid tea concentrate in brew tank 12 by means of blend pump 18.

After additives have been introduced, a liquid sweetener, such as sugar, from sweetener source 92 may be added. The use of a sweetener is optional and may not be used for unsweetened tea. Sweetener source 92 is connected by conduit 94 to second mass flow meter 96, which may be a Micromotion mass flow meter. Conduit 98 conducts sweetener from second mass flow meter 96 through second heat exchanger 100 and through a check valve 102 into conduit 24 for mixing with the liquid tea concentrate in conduit 24. Check valve 102 may be a Tricolver check valve and prevents back flow in conduit 98. Second heat exchanger 100 may be a steam heat exchanger and connected to steam source 28 for heating the sweetener to between about 95° F. and 110° F., and preferably to about 100° F. Approximately 2,300 gallons of sweetener is added per 2,100 gallons of liquid tea concentrate. Liquid sweetener is added at a rate of about 60 gallons per minute.

As liquid tea concentrate is pumped by blend pump 18 from blend tank 12 through conduit 24 liquid sweetener is introduced into conduit 24 and mixed with the liquid tea concentrate. Valve 103 is then activated and the mixture of liquid tea concentrate and liquid sweetener are pumped by blend pump 18 through conduit 104 while sweetener is introduced and into transfer tank 108, which may be a 5,000 gallon tank.

From transfer tank 108, the blended tea concentrate is pumped by transfer pump 110 through conduit 112 and through a conventional cooling system 116 chosen from those well known in the art, where the blended tea concentrate is cooled to between about 40° F. and 50° F., and preferably to about 45° F. From cooling system 116, the blended tea concentrate is pumped through conduit 18 and into one of three (3) storage tanks 124 located in cold storage room 128 and stored at between approximately 40–45° F. Once the blended tea concentrate is pumped into storage tanks 124, the brewing system and blending system may be purged with nitrogen to clean the system and remove oxygen. Throughout the process, the liquid tea concentrate and liquid tea are not exposed to outside air.

Next, the blended tea concentrate is pumped by pump 130, which may be a three (3) horsepower Thompson centrifugal pump, through conduit 132 and into mixing tanks 134. Water from water source 136, which may be purified water, is then introduced into conduits 140 and into mixing tanks 134. Water is mixed with the blended tea concentrate in proportions of about six (6) gallons of water for each gallon of blended tea concentrate to produce the liquid tea product. In addition, vitamins, diet sweetener, flavorings or other additives may be added. The product is then transferred to bottler system 144 where the product is placed in plastic bottles. The plastic bottles are then moved to the pasteurization system 146 where the product is pasteurized in the bottles using a pasteurization method well known in the art. From pasteurization system 146, the bottles are moved through conveyor cooling system 148 to cool the product to room temperature. Thereafter, the product may be distributed for sale.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims.

What is claimed is:

1. Method for brewing tea comprising:
   introducing water into a blend tank;
   circulating water from said blend tank through a heat exchanger for heating said water to a predetermined temperature and returning said water to said blend tank;
   transferring said water into a brew tank containing tea;
   circulating said water in said brew tank into contact with said tea thereby producing liquid tea concentrate; and
   circulating said concentrate from said brew tank through said heat exchanger and said blend tank.

2. The method according to claim 1 wherein said method further comprises mixing a liquid sweetener with said concentrate.

3. The method according to claim 2 wherein said step of mixing a liquid sweetener comprises introducing said liquid sweetener into said concentrate while said concentrate is circulated through said heat exchanger.

4. The method according to claim 3 wherein said method further comprises conducting said liquid sweetener through a second heat exchanger for heating said liquid sweetener prior to introducing said liquid sweetener into said concentrate.

5. The method according to claim 4 wherein said method further comprises conducting said liquid sweetener through a mass flow meter for measuring the quantity of sweetener added.

6. The method according to claim 5 wherein said method further comprises circulating said water through a mass flow meter to measure the quantity of water.

7. The method according to claim 6 wherein said method further comprises introducing flavoring to said concentrate as said concentrate is circulated through said heat exchanger.

8. The method according to claim 1 wherein said method further comprises circulating said concentrate through a cooling system to cool said concentrate.

9. The method according to claim 8 wherein said method further comprises storing said concentrate in a storage tank in a cold storage room after passing through said cooling system.

10. The method according to claim 9 wherein said method further comprises introducing said concentrate into a mixing tank and adding water to said concentrate to produce a liquid tea beverage.

11. The method according to claim 10 wherein said method further comprises mixing a liquid sweetener with said concentrate.

12. The method according to claim 11 wherein said step of mixing a liquid sweetener comprises introducing said liquid sweetener into said concentrate while said concentrate is circulated through said heat exchanger.

13. The method according to claim 12 wherein said method further comprises conducting said liquid sweetener through a second heat exchanger for heating said liquid sweetener prior to introducing said liquid sweetener into said concentrate.

14. The method according to claim 13 wherein said method further comprises conducting said liquid sweetener through a mass flow meter for measuring the quantity of sweetener added.

15. The method according to claim 14 wherein said method further comprises circulating said water through a mass flow meter to measure the quantity of water.

16. The method according to claim 15 wherein said method further comprises introducing flavoring to said concentrate as said concentrate is circulated through said heat exchanger.

17. The method according to claim 1 wherein said method further comprises:
   placing a plurality of tea bags on a lifting base disposed in said brew tank; and
   raising said lifting base until said tea bags contact a holding plate thereby squeezing liquid tea concentrate from said tea bags.

18. The method according to claim 17 wherein said method further comprises:
   raising said lifting base to place said tea bags on said lifting base; and
   lowering said lifting base into said brew tank.

19. Method for brewing tea comprising:
   placing a plurality of tea bags on a lifting base disposed in a brew tank;
   lowering said lifting base into said brew tank;
   introducing water into a blend tank;
   circulating water from said blend tank through a first heat exchanger for heating said water to a predetermined temperature and returning said water to said blend tank;
   circulating said water from said blend tank through said brew tank and into contact with said tea bags thereby brewing liquid tea concentrate;
   circulating said water from said brew tank through said first heat exchanger and through said blend tank;
   raising said lifting base until said tea bags contact a holding plate thereby squeezing liquid tea concentrate from said tea bags; and
   mixing a liquid sweetener with said liquid tea concentrate.

20. The method according to claim 19 wherein said method further comprises conducting said concentrate through a cooling system to cool said concentrate.

21. The method according to claim 20 wherein said method further comprises introducing said concentrate into a mixing tank and adding water to said concentrate to produce a liquid tea beverage.

22. The method according to claim 21 wherein said step of mixing a liquid sweetener comprises introducing said liquid sweetener into said concentrate while said concentrate is circulated through said first heat exchanger.

23. The method according to claim 22 wherein said method further comprises conducting said liquid sweetener through a second heat exchanger for heating said liquid sweetener prior to introducing said liquid sweetener into said concentrate.

24. The method according to claim 23 wherein said method further comprises conducting said liquid sweetener through a mass flow meter for measuring the quantity of sweetener added.

25. The method according to claim 24 wherein said method further comprises circulating said water through a mass flow meter to measure the quantity of water.

26. The method according to claim 25 wherein said method-further comprises introducing flavoring to said concentrate as said concentrate is circulated through said first heat exchanger.

* * * * *